US012718687B2

(12) United States Patent
Kim

(10) Patent No.: US 12,718,687 B2
(45) Date of Patent: Aug. 25, 2026

(54) TRAFFIC SPEED PREDICTION DEVICE AND METHOD THEREFOR

(71) Applicants: Hyundai Motor Company, Seoul (KR); Kia Corporation, Seoul (KR)

(72) Inventor: Nam Hyuk Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 144 days.

(21) Appl. No.: 18/526,190

(22) Filed: Dec. 1, 2023

(65) Prior Publication Data

US 2025/0061803 A1 Feb. 20, 2025

(30) Foreign Application Priority Data

Aug. 16, 2023 (KR) ........................ 10-2023-0107061

(51) Int. Cl.

*G08G 1/052* (2006.01)
*G08G 1/01* (2006.01)
*G08G 1/04* (2006.01)

(52) U.S. Cl.

CPC ........... *G08G 1/052* (2013.01); *G08G 1/0112* (2013.01); *G08G 1/0133* (2013.01); *G08G 1/04* (2013.01)

(58) Field of Classification Search

CPC .... G08G 1/052; G08G 1/0112; G08G 1/0133; G08G 1/04; G08G 1/0129; G08G 1/0141; G08G 1/0125; G08G 1/0137

See application file for complete search history.

(56) References Cited

U.S. PATENT DOCUMENTS

| | | | | |
|---|---|---|---|---|
| 5,801,943 | A * | 9/1998 | Nasburg | G08G 1/096775 340/910 |
| 9,582,999 | B2 * | 2/2017 | Lewis | G08G 1/0112 |
| 2008/0234921 | A1 * | 9/2008 | Groenhuijzen | G08G 1/091 701/414 |
| 2013/0124012 | A1 * | 5/2013 | Shida | G08G 1/08 701/2 |
| 2015/0120174 | A1 * | 4/2015 | Lewis | G08G 1/0129 701/118 |

(Continued)

FOREIGN PATENT DOCUMENTS

| | | | | |
|---|---|---|---|---|
| CN | 113160570 | A * | 7/2021 | G06N 3/045 |
| CN | 115830866 | A * | 3/2023 | |

(Continued)

OTHER PUBLICATIONS

English Translation JP2021117678A (Year: 2025).*
English Translation KR 20230037209A (Year: 2025).*

*Primary Examiner* — Rami Khatib
(74) *Attorney, Agent, or Firm* — Banner & Witcoff, Ltd.

(57) ABSTRACT

A traffic speed prediction apparatus may include: a communication device configured to receive probe data from a probe vehicle driving on a road; a storage configured to store data and algorithms for predicting a traffic speed; and at least one processor electrically connected to the communication device and the storage. The processor may be configured to predict the traffic speed on the road using traffic speed data, traffic volume data, and congestion data obtained based on probe data, and to obtain the congestion data by creating a target road network including a target collection section where the probe data is collected and determining a congestion matrix of the target road network.

20 Claims, 9 Drawing Sheets

(56) References Cited

U.S. PATENT DOCUMENTS

| | | | | |
|---|---|---|---|---|
| 2016/0203712 | A1* | 7/2016 | Blandin | G08G 1/0116 701/117 |
| 2020/0042928 | A1* | 2/2020 | Kim | G06F 16/9024 |
| 2021/0133569 | A1* | 5/2021 | Li | G06N 3/04 |
| 2022/0221298 | A1* | 7/2022 | Chikamori | G01C 21/3658 |
| 2023/0298461 | A1* | 9/2023 | Kim | G08G 1/0133 |
| 2024/0038064 | A1 | 2/2024 | Kim et al. | |
| 2024/0126936 | A1* | 4/2024 | Zhu | G06F 30/13 |

FOREIGN PATENT DOCUMENTS

| | | | | | |
|---|---|---|---|---|---|
| JP | 2021117678 | A | * | 8/2021 | |
| KR | 101045863 | B1 | * | 7/2011 | G08G 1/0145 |
| KR | 20190083269 | A | * | 7/2019 | G08G 1/0137 |
| KR | 10-2022-0081208 | A | | 6/2022 | |
| KR | 10-2022-0138263 | A | | 10/2022 | |
| KR | 20230037209 | A | * | 3/2023 | G01C 21/26 |
| KR | 10-2023-0134915 | A | | 9/2023 | |
| KR | 10-2024-0016728 | A | | 2/2024 | |
| WO | WO-2014188586 | A1 | * | 11/2014 | G08G 1/0112 |
| WO | WO-2015055780 | A1 | * | 4/2015 | G08G 1/163 |

* cited by examiner

TRAFFIC SPEED PREDICTION DEVICE AND METHOD THEREFOR

CROSS-REFERENCE TO RELATED APPLICATION

This application claims priority to and the benefit of Korean Patent Application No. 10-2023-0107061, filed in the Korean Intellectual Property Office on Aug. 16, 2023, the entire contents of which are incorporated herein by reference.

TECHNICAL FIELD

The present disclosure relates to a traffic speed prediction apparatus and a method therefor, and more specifically, to a technique for predicting future traffic speed by determining a shock wave speed within a congested road network urban road.

BACKGROUND

A traffic speed for a specified time in the future can be predicted (e.g., via deep learning) using traffic speed data for a specified time in the past and/or traffic volume data for a specified time in the past. However, some future prediction technology (e.g., using conventional deep learning) has a problem in that accuracy of prediction power is high for a pair of input and output with clear causality with past speeds, but accuracy of prediction power cannot be guaranteed for a pair of input and output with unclear causality.

Also, or alternatively, there may be reduced accuracy in predicting traffic speeds if relationships between road sections in a road network with many intersections are not reflected.

SUMMARY

The following summary presents a simplified summary of certain features. The summary is not an extensive overview and is not intended to identify key or critical elements.

Systems, apparatuses, and methods are described for traffic speed prediction. A traffic speed prediction apparatus may comprise: a communication device configured to receive probe data from a probe vehicle driving on a road; a storage configured to store the probe data and algorithms for predicting a traffic speed; and at least one processor coupled to the communication device and the storage. The at least one processor may be configured to: predict, based on traffic speed data, traffic volume data, and congestion data, a traffic speed on the road, wherein the traffic speed data, the traffic volume data, and the congestion data are based on the probe data; and obtain the congestion data by: generating a target road network comprising a target collection section corresponding to a location from which the probe data is collected; and determining a congestion matrix of the target road network.

Also, or alternatively, a traffic speed prediction method may comprise: receiving, by a processor, probe data from a probe vehicle driving on a road; obtaining, by the processor, traffic speed data and traffic volume data based on the probe data; generating, by the processor, a target road network comprising a target collection section corresponding to a location where the probe data was collected by the probe vehicle; determining, by the processor, congestion data comprising a congestion matrix of the target road network; and predicting, by the processor, a traffic speed on the road using the traffic speed data, the traffic volume data, and the congestion data.

These and other features and advantages are described in greater detail below.

DETAILED DESCRIPTION

Figure 1:
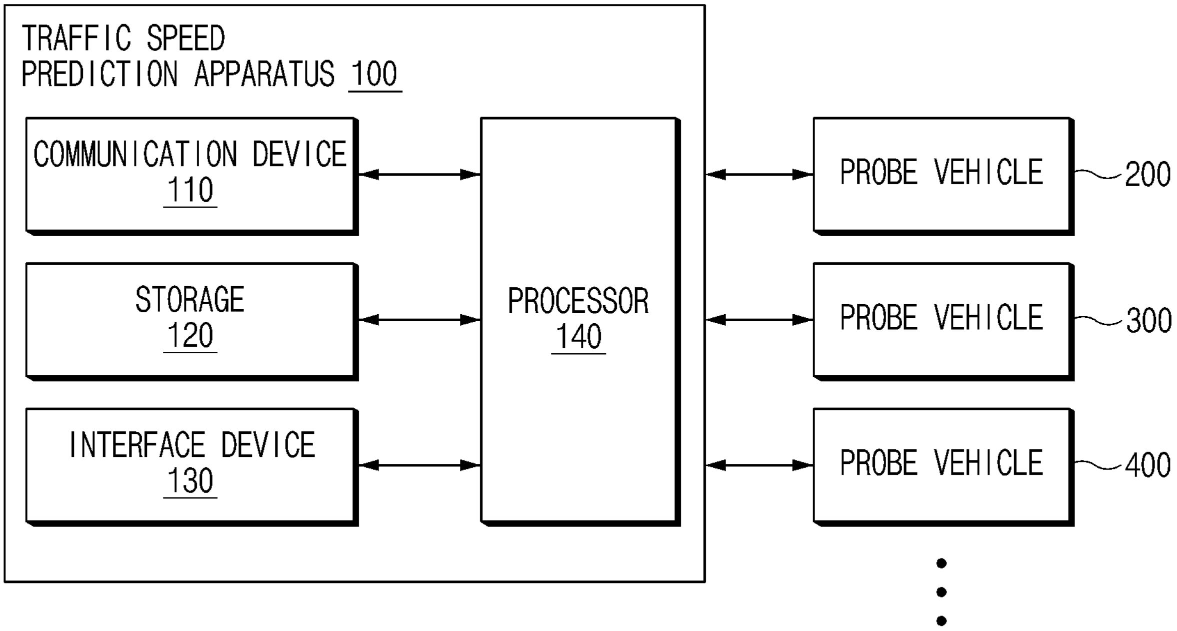
FIG. 1 illustrates a block diagram showing an example traffic speed prediction apparatus.

Hereinafter, some examples of the present disclosure will be described in detail with reference to exemplary drawings. It should be noted that in adding reference numerals to constituent elements of each drawing, the same constituent elements have the same reference numerals as possible even though they are indicated on different drawings. In describing an example, when it is determined that a detailed description of the well-known configuration or function associated with the example may obscure the gist of the present disclosure, it will be omitted.

In describing constituent elements according to an example, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various examples of the present disclosure will be described in detail with reference to FIG. 1 to FIG. 8.

FIG. 1 illustrates a block diagram showing an example traffic speed prediction apparatus.

The traffic speed prediction apparatus 100 according to the present disclosure may be implemented inside and/or outside of a vehicle. The traffic speed prediction apparatus 100 may be formed integrally with internal control units of a vehicle, and/or may be implemented as a separate configuration and/or device from the vehicle. The traffic speed prediction apparatus 100 may be installed in and/or attached to the vehicle, and/or a portion of the traffic speed prediction apparatus 100 may be implemented integrally with the vehicle, and another portion may be implemented as a separate configuration and/or device from the vehicle and/or installed and/or attached to the vehicle. The traffic speed prediction apparatus 100 may be implemented as an integral and/or separate hardware device, connected to the control units of the vehicle via a connection means (e.g., wired and/or wireless communication).

The traffic speed prediction apparatus 100 may be configured to predict a traffic speed on a road using traffic speed data, traffic volume data, and congestion data obtained based on probe data, and may obtain the congestion data by creating a target road network including a target collection section where probe data is collected and determining a congestion matrix of the target road network.

In this case, the probe data may include GPS data, coordinate data, and/or time data.

Also, or alternatively, the traffic speed data may include traffic speed data for a predetermined period of time in the past for a target collection section and a previous collection section. The traffic volume data may include traffic volume data for a predetermined time in the past for a target collection section and a previous collection section, and may include exit traffic volume and remaining traffic volume, etc. The congestion data may include congestion information based on a shock wave speed propagated between road sections.

Referring to FIG. 1, the traffic speed prediction apparatus 100 may include a communication device 110, a storage 120, an interface device 130, and a processor 140.

The traffic speed prediction apparatus 100 may be implemented as a single unit, for example, by coupling components with each other, and/or some components may be omitted.

The communication device 110 may be a hardware and/or software implemented device implemented with various electronic circuits to transmit and receive signals via a wireless and/or wired connection. The communication device 110 may transmit information to and/or receive information from devices within the traffic speed prediction apparatus 100 (e.g., storage 120, interface device 130, and/or processor 140) and/or external to (e.g., remote/separate from) the traffic speed prediction apparatus 100 based on network communication techniques. As an example, the internal network communication techniques may include controller area network (CAN) communication, local interconnect network (LIN) communication, flex-ray communication, and the like.

Also, or alternatively, the communication device 110 may communicate with external probe vehicles 200, 300, and 400, servers (not illustrated), and infrastructure (not illustrated) by using at least one of a mobile communication module, a wireless Internet module, short range communication, or any combination thereof.

The mobile communication technique may communicate with the probe vehicles 200, 300, and 400 via a mobile communication network established according to technical standards and/or communication methods for mobile communication (e.g., global system for mobile communication (GSM), code division multi access (CDMA), code division multi access 2000 (CDMA 2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), 4th generation mobile telecommunication (4G), 5th generation mobile telecommunication (5G).

The wireless Internet module may be a module for wireless Internet access, and may communicate with the probe vehicles 200, 300, and 400 via wireless LAN (WLAN), wireless-fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), etc.

The short-range communication module may support short-range communication by using at least one of Bluetooth™, radio frequency identification (RFID), infrared data association (IrDA), ultra wideband (UWB), ZigBee, near field communication (NFC), a wireless universal serial bus (USB) technique, or any combination thereof.

As an example, the communication device 110 may receive probe data from the probe vehicles 200, 300, and 400. In this case, the probe data may include GPS data, coordinate data, and/or time data.

The storage 120 may store data and/or algorithms required for the processor 140 to operate according to the present specification. As an example, the storage 120 may store a traffic speed prediction model and a congestion matrix model for predicting a traffic speed. Also, or alternatively, the storage 120 may store input data that the traffic speed prediction apparatus 100 is to use to determine a prediction result and/or result data outputted by the traffic speed prediction apparatus 100. Also, or alternatively, the storage 120 may store various logic, algorithms, and/or programs for processing input data and output data to predict the traffic speed.

Also, or alternatively, the storage 120 may store data and algorithms for generating a congestion matrix.

The storage 120 may include a storage medium of at least one type of memory, such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk. The storage 120 may comprise non-transitory computer readable storage media storing instructions that, when executed (e.g., by the processor 140) may configure the processor to perform one or more of the operations disclosed herein.

The interface device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display. As an example, the interface device 130 may display the predicted traffic speed for each road section (e.g., based on input of a time at which the predicted traffic is requested and/or a request to output directions to a location of interest).

The output device may include a display, and may also include a voice output means such as a speaker. In the instant case, in a response to a case that a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The processor 140 may be communicatively (e.g., electrically) connected to the communication device 110, the storage 120 and/or the interface device 130. The processor 140 may electrically control each component via the communicative (e.g., electrical) connection. The processor 140 may comprise an electrical circuit configured to executes software commands and/or instructions (e.g., such as those stored in the storage 120), thereby performing various data processing and calculations described herein.

The processor 140 may process a signal (e.g., transferred between components of the traffic speed prediction apparatus 100) to perform overall control such that each component performs its function as disclosed herein. The processor 140 may be implemented in the form of hardware, software, or a combination of hardware and software. For example, the processor 140 may be implemented as a microprocessor, but the present disclosure is not limited thereto.

The processor 140 may predict a traffic speed on a road using traffic speed data, traffic volume data, and congestion data obtained based on probe data, and may obtain the congestion data by creating (e.g., generating) a target road network (see FIG. 5B) including a target collection section (e.g., a road section for which probe data is collected) and determining a congestion matrix of the target road network.

The processor 140 may determine a congestion matrix based on at least one of traffic speed data within the target road network, exit traffic volume (e.g., a quantity of vehicles advancing from the target collection section to the road section ahead), a length of each road section within the target road network, or any combination thereof.

The processor 140 may generate a target road network (e.g., a virtual target road network, image data representing the target road network, etc.) by shaping a traffic flow of adjacent road sections into a directional graph structure based on the target collection section.

The processor 140 may determine an initial shock wave speed matrix by determining shock wave speeds of road sections within the target road network.

The processor 140 may determine the shock wave speed from a first road section to a second road section (e.g., over the first road section to the second road section) based on (e.g., by using) at least one of a traffic volume entering the first road section 210 among the road sections, a traffic volume entering the second road section 220 (e.g., a traffic volume entering the target collection section) among the road sections, density of a traffic flow on the first road section, density of a traffic flow on the second road section, or any combination thereof.

In response to (e.g., based on) a case where n road sections (e.g., n=8 in FIG. 5, for road sections ①, ②, ③, ④, ⑤, ⑥, ⑦, ⑧ in FIG. 5) are included in the target road network, the processor 140 may configure an initial shock wave speed matrix (e.g., Equation 7) by storing a speed of a shock wave propagating from the first road section ① to the second road section ②, a speed of a shock wave propagating from the first road section ① to the third road section ③, and a speed of a shock wave propagating from the first road section ① to the nth road section ⓝ as values of a first row of the initial shock wave speed matrix, storing a speed of a shock wave propagating from the second road section ② to the first road section ①, a speed of a shock wave propagating from the second road section ② to the third road section ③, and a speed of a shock wave propagating from the second road section ② to the nth road section ⓝ as values of a second row of the initial shock wave speed matrix, and storing a speed of a shock wave propagating from the n$^{th}$ road section ⓝ to the first road section ①, a speed of a shock wave propagating from the n$^{th}$ road section ⓝ to the second road section ②, and a speed of a shock wave propagating from the n$^{th}$ road section ⓝ to the n$^{th}$ road section (ⓝ) as values of a n$^{th}$ row of the initial shock wave matrix.

The processor 140 may determine an adjacency matrix (e.g., Equation 5) by reflecting the traffic flow of the road sections adjacent to the target collection section within the target road network.

In response to (e.g., in, based on) a case where n road sections are included in the target road network, the processor 140 may configure an adjacency matrix A in a form of an n×n square matrix, and in this case, may store information related to a traffic flow of n adjacent road sections as 0 or 1 based on the first road section ① in a first row of the adjacency matrix A, may store information related to the traffic flow of n adjacent road sections as 0 or 1 based on the second road section (②) in the second row of the adjacency matrix, and may store information related to the traffic flow of n adjacent road sections as "0" or "1" based on the n$^{th}$ road section (ⓝ) in the n$^{th}$ row of the adjacency matrix A (see, e.g., Equation 5).

The processor 140 may store information related to the traffic flow of the corresponding road section as "1" in response to (e.g., in, based on) a case where traffic flows in a direction entering the first road section ①, and may store information related to the traffic flow of the corresponding road section as "0" in response to (e.g., in, based on) the case where traffic flows in the direction exiting the first road section ① among the n road sections.

The processor 140 may determine the initial shock wave speed matrix (e.g., Equation 7) and the adjacency matrix (e.g., Equation 5) to determine a shock wave speed matrix (e.g., Equation 8) that represents a speed of a shock wave propagated for each road section.

The processor 140 may determine a congestion severity vector (e.g., Equation 10) representing an average congestion severity per number of intersections for each road section by using the shock wave speed matrix (e.g., Equation 7) and the adjacency matrix (e.g., Equation 5).

The processor 140 may determine an n×1 congestion severity vector (E.g., Equation 10) by using (e.g., based on) a sum of shock wave speeds of the n road sections in the shock wave speed matrix and a number of drivable intersections of the n road sections in the adjacency matrix, The processor 140 may determine a congestion activation vector (e.g., Equation 11) that indicates resolution or propagation of congestion by using a value obtained by adding a distance vector of each road section to a congestion severity vector (e.g., Equation 10).

The processor 140 may use (e.g., apply) a negative pass filter (e.g., to the congestion activation vector) to determine that congestion will be resolved within a predetermined unit time in a current road section in response to (e.g., in, based on) a case where the sum of the congestion severity vector (e.g., Equation 10) and the distance vector of each road section is positive, and to determine that congestion will occur from the current road section to the adjacent road section in response to (e.g., in, based on) a case where the sum of the congestion severity vector (e.g., Equation 10) and the distance vector of each road section is negative.

The processor 140 may determine a congestion vector (e.g., Equation 12) that represents an extent to which congestion spreads to adjacent road sections by matrix multiplying the congestion activation vector with an adjacency matrix squared N times.

The processor 140 may configure a congestion matrix (e.g., Equation 13) by determining an expected congestion vector from a current point to N unit time(s) later.

The processor 140 may predict a traffic speed of the target road network up to N unit times in the future by using traffic speed data and traffic volume data for a past M hours of the target collection section and congestion data up to N unit times in the future for the target road network.

As such, according to the present disclosure, accuracy of a traffic speed prediction result may be increased over existing techniques by predicting a future traffic speed using a congestion matrix that effectively reflects a relationship between road sections in a road network with many intersections.

According to the present disclosure, by determining the shock wave speed for each road section, it may be possible to determine a length through which congestion propagates per unit time (e.g., a distance over which a congestion start point becomes longer). In response to (e.g., in, based on) a case where congestion does not exceed the length of the road section (e.g., based on a determination that congestion does not propagate through a length of a road section per unit time), the congestion activation vector may be deactivated and may not be calculated in the congestion matrix, thereby preventing accumulation and divergence.

Also, or alternatively, according to the present disclosure, a final congestion matrix may be obtained by matrix multiplying the congestion activation vector with the adjacency matrix of the road network, and thus interdependence of the road sections within the target road network may be reflected.

Also, or alternatively, the congestion matrix may have a same shape as that of the traffic speed after N unit times to be predicted, and this can give a direct relationship to each element of the traffic speed to be predicted, and thus future traffic speed prediction accuracy quality may be improved by predicting the future traffic speed using a highly causal congestion matrix.

Figure 2:
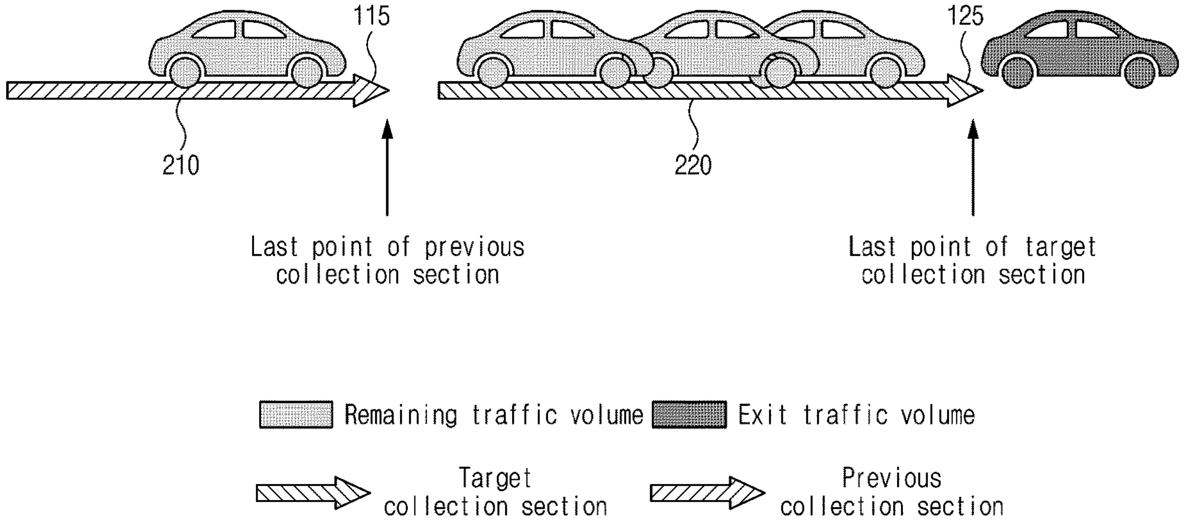
FIG. 2 illustrates an example view for describing a remaining traffic volume and an exit traffic volume for predicting traffic speed.

FIG. 2 illustrates an example view for describing a remaining traffic volume and an exit traffic volume for predicting traffic speed.

Referring to FIG. 2, the road section is divided into a previous collection section 110 and a target collection section 220. In this case, the target collection section 220 refers to a section in which probe data is collected, and the previous collection section 110 refers to a section that was previously the target collection section.

Also, or alternatively, the target collection section 220 may include a road section connected to the front road section where probe data is collected. Hereinafter, in this document, the target collection section 220 may be referred to as a second section, a target road, a target section, a target road section, a target road, a target section, a target collection section, etc. Also, or alternatively, the front road section connected to the target collection section may be referred to as a first section, a previous collection section, etc.

The exit traffic volume may be defined as a number of probe vehicles that all exit the target collection section 220. Since the number of probe vehicles exiting the target collection section 220 during a specified time is 1, an example in which an exit traffic volume is 1 is disclosed.

The remaining traffic volume may be defined by the number of probe vehicles obtained by subtracting the number of probe vehicles passing a first point 115, which is a last point of the previous collection section 110 of the target collection section 220, from the number of probe vehicles passing the second point 125, which is a last point of the target collection section 220. That is, the remaining traffic volume may be defined as the number of probe vehicles driving in the target collection section 220.

In FIG. 2, the number of probe vehicles driving in the target collection section 220 during a specified time may be 3, and the remaining traffic volume may be defined as 3.

Figure 3:
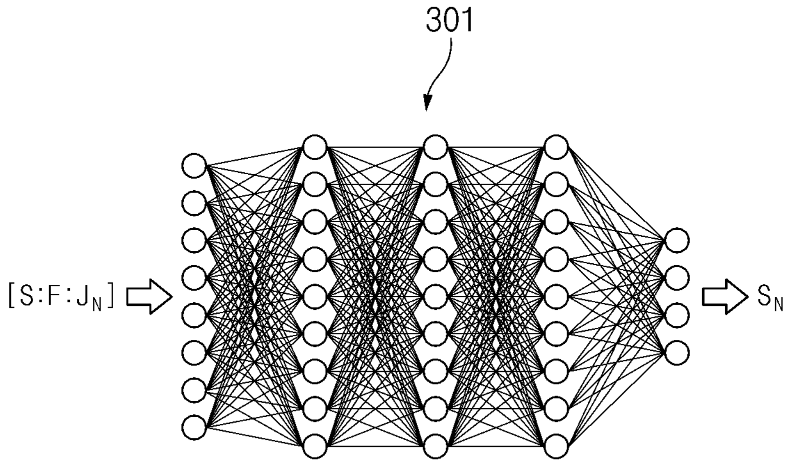
FIG. 3 illustrates an example of a traffic speed prediction model.

FIG. 3 illustrates an example of a traffic speed prediction model.

Referring to FIG. 3, the traffic speed prediction apparatus 100 may control at least one artificial neural network using a processor (not illustrated) and may include a traffic speed prediction model 301.

For example, the traffic speed prediction apparatus 100 may input data into an artificial neural network, and may provide a traffic speed prediction function based on a vehicle driving situation (e.g., a traffic speed and/or a traffic volume) through output data outputted through various layers included in the artificial neural network.

The traffic speed prediction model 301 may be a component implemented as an artificial neural network structure including at least one layer (e.g., an input layer, an output layer, and multiple hidden layers disposed between the input layer and the output layer).

The traffic speed prediction apparatus 100 may input traffic speed data S for past M times in the input layer of the traffic speed prediction model 301, traffic volume data F for the past M times, and a congestion matrix $J_N$ that is congestion data of the entire road network up to N unit times in the future, and may acquire speed data $S_N$ of the entire road network up to N unit times in the future, which is outputted to the output layer through a plurality of layers.

The congestion matrix $J_N$, which may comprise congestion data of the entire road network up to N unit times in the future, may comprise a congestion matrix that determines congestion up to N times in the future based on the current shock wave speed. Also, or alternatively, all data input to the traffic speed prediction model 301 may be combined and/or input via an concatenate operation.

Figure 4:
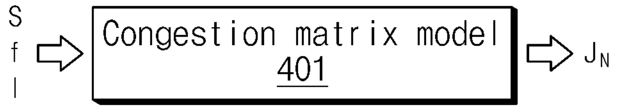
FIG. 4 illustrates an example of a congestion matrix model for predicting traffic speed.

FIG. 4 illustrates an example of a congestion matrix model for predicting traffic speed.

Referring to FIG. 4, the congestion matrix $J_N$ may be outputted in response to (e.g., in, based on) a case where the traffic speed S, the exit traffic volume f, and the length l of each road section within the current road network are entered into a congestion matrix model 401.

In order to acquire this congestion matrix $J_N$, the traffic speed prediction apparatus 100 may estimate a propagation time within an urban road of a congested road network based on shock wave theory.

First, to describe the shock wave theory, a shock wave refers to a wave (transition phenomenon) that occurs due to speed changes between different traffic flows.

In response to (e.g., in, based on) a case where a smooth flow of traffic and a flow of congestion change on a road, a wave (shock wave) may be generated. The shock wave may precisely refers to a speed at which a point at which congestion begins propagates.

$$w_{ab} = \frac{q_a - q_b}{k_a - k_b} \quad \text{(Equation 1)}$$

where $q_a$ indicates an exit traffic volume of a traffic flow at a point a, $q_b$ indicates an exit traffic volume of a traffic flow at a point b, $k_a$ indicates density of the traffic flow at the point a, and $k_b$ indicates density of the traffic flow at the point b.

$$k_n = \frac{q_n}{u_n} = \frac{f_n\,[\text{number of vehicle/5 minute}]}{v_n\left[\frac{\text{km}}{\text{h}}\right]} = \frac{f_n\,[\text{number of vehicle/5 minute}]}{\frac{l_n}{t_n}/36_n\left[\frac{\text{m}}{\text{s}}\right]} = \frac{f_n\frac{t_n}{300}[\text{number of vehicle/5 minute}]}{l_n[m]} * 3.6 = 0.012\frac{f_n t_n}{l_n}[\text{number of vehicle/minute}] \quad \text{(Equation 2)}$$

where $k_n$ which indicates road density of a $n^{th}$ road based on remaining traffic volume at a unit of time, $f_n$ indicates an exit traffic volume from the $n^{th}$ road as a function of time (e.g., units of time, time/time unit increment, with a time unit increment of 5 minutes in the example), $v_n$ indicates a travel speed over the $n^{th}$ road, $I_n$ indicates a travel distance over the $n^{th}$ road, and $t_n$ indicates a travel time over the $n^{th}$ road.

The shock wave speed can be calculated as shown in Equation 3 below by substituting Equation 2, which is the road density of the $n^{th}$ road based on the remaining traffic volume, into Equation 1.

$$w_{ab} = \frac{q_a - q_b}{k_a - k_b} = \frac{1}{0.012}\frac{f_a - f_b}{\frac{f_a t_a}{l_a} - \frac{f_b t_b}{l_b}}\left[\frac{\text{m}}{5\ \text{minute}}\right] = \quad \text{(Equation 3)}$$

$$\begin{cases} q = f \\ k_n = 0.012\frac{f_n t_n}{l_n}\ [\text{number of vehicle/minute}] \end{cases}$$

A congestion start point from the point a to the point b in the road section indicates moving with a shock wave speed $W_{ab}$. A congestion volume may be determined by determining how far the congestion start point moves per unit time.

In this case, the shock wave speed $W_{ab}$ may be a value obtained by dividing a difference in traffic volume between road sections by a difference in physical capacity of the road section, as in Equation 4 below.

$$W_{ab} = \frac{\text{Difference in traffic volume}}{\text{Difference in physical volume}} \quad \text{(Equation 4)}$$

$W_{ab}$ becomes negative in a state where traffic flows from the point a to the point b and a bottleneck occurs at the point b.

Figure 5A:
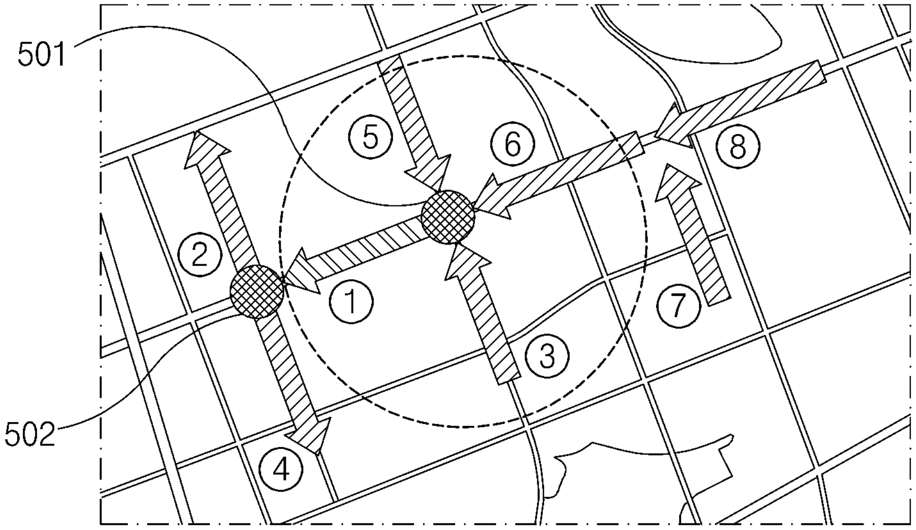
FIG. 5A illustrates road sections and traffic flows of an example urban road network.
Figure 5B:
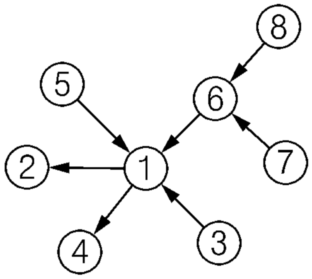
FIG. 5B illustrates an example view structuring road sections and traffic flows of an urban road network as a graph.

FIG. 5A illustrates road sections and traffic flows of an example urban road network, and FIG. 5B illustrates an example view structuring road sections and traffic flows of an urban road network as a graph.

An urban road including road sections and intersections, as illustrated in FIG. 5A, may be mapped into a directional graph structure as illustrated in FIG. 5B.

As illustrated in FIG. 5A, road sections ①, ②, ③, ④, ⑤, ⑥, ⑦, and ⑧ are included in a road network (e.g., through which a user/vehicle, etc., may move to a destination) a traffic flow may be expressed by reflecting an edge, which is an end of each road section. For example, in response to (e.g., in, based on) a case where edges of node link ① are 501 and 502, node links ③, ⑤, and ⑥ indicate a flow of traffic entering the edge 501, and node links ② and ④ indicate a flow of traffic flowing from the edge 502.

Two physically connected road sections may be schematized as shown in FIG. 5B by connecting them with an edge. For the road sections ② and ④ arrows are drawn from ① to ② and from ① to ④ in a direction of exiting outward from the road section ①, based on the road section ①. In this case, a number of intersections centered on the edges 501 and 502 may be known.

For the road sections ③, ⑤, and ⑥, arrows are drawn toward the road section ①, and for the road sections ⑦ and ⑧, arrows are drawn toward the road section ⑥.

A schematic traffic flow may be formed to include an adjacency matrix as illustrated in Equation 5 below.

$$A = \begin{bmatrix} 0&0&1&0&1&1&0&0 \\ 1&0&0&0&0&0&0&0 \\ 0&0&0&0&0&0&0&0 \\ 1&0&0&0&0&0&0&0 \\ 0&0&0&0&0&0&0&0 \\ 0&0&0&0&0&0&1&1 \\ 0&0&0&0&0&0&0&0 \\ 0&0&0&0&0&0&0&0 \end{bmatrix} \quad \text{(Equation 5)}$$

Since there are 8 road sections in the traffic flow schematized in FIG. 5B, the adjacency matrix A in Equation 5 is disclosed as an example of an 8×8 matrix.

However, in response to (e.g., in, based on) a case where the road section is not limited to 8 and there are n road sections, it may be configured as an n×n matrix.

A first row of the adjacency matrix A has a value "0 0 1 0 1 1 0 0", which reflects the number of intersections connected to the road section ①. In other words, the road section where traffic flows in a direction of the road section ① should have a value of "1". In FIG. 5B, the road section where traffic flows in the direction of road section ① corresponds to the road sections ③, ⑤, and ⑥, and thus "1" is stored in second, fifth, and sixth columns of the first row of the adjacency matrix A. Since there is only one road section ① where traffic flows in a direction of the road section ②, a second row of the adjacency matrix A has a value "1 000000 0". Similarly, since there is only one road section ① where traffic flows in a direction of road section ④, a fourth row of the adjacency matrix A has a value of "1 0 0 0 0 0 0 0". Values of all rows of the adjacency matrix A is stored in the same way as above.

A future speed prediction apparatus 100 may determine a shock wave speed matrix.

The future speed prediction apparatus 100 may determine the shock wave speed Wab between road points (e.g., between the point a and the point b) as shown in Equation 6 below by using (e.g., based on) the exit traffic volume f and density k per unit time (e.g., 5 minutes).

$$w_{ab} = \frac{1}{0.012}\frac{f_a - f_b}{\frac{f_a t_a}{l_a} - \frac{f_b t_b}{l_b}}[\text{m/5 minute}] \quad \text{(Equation 6)}$$

In this case, $f_a$ indicates an exit traffic volume from the point a, $f_b$ indicates an exit traffic volume from the point b, $t_a$ indicates a passing time of the point a, to indicates a passing time of the point b, $l_a$ indicates a length of the road section including the point a, and $l_b$ indicates a length of a road section including the point b.

The future speed prediction apparatus 100 may determine a first value obtained by dividing a product of the exit traffic volume fa at the point a and the passing time ta of the point a by the length la of the road section including the point a, may determine a second value obtained by multiplying the exit traffic volume $f_b$ at the point b by the passing time to at the point b divided by the length $l_b$ of the road section including the point b, and when a value obtained by subtracting the second value from the first value is called a third value, may determine the shock wave speed Wab by subtracting the exit traffic volume fb at the point b from the exit traffic volume $f_a$ at the point a, dividing it by the third value, and multiplying it by 1/0.012.

By determining a shock wave speed for all roads using Equation 6, an initial shock wave speed matrix $W_{init}$, which is a square matrix, may be defined as shown in Equation 7 below.

$$w_{init} = \begin{bmatrix} w_{11} & \cdots & w_{18} \\ \vdots & \ddots & \vdots \\ w_{81} & \cdots & w_{88} \end{bmatrix} \quad \text{(Equation 7)}$$

$W_{11}$ indicates a shock wave speed value from the road section ① to the road section ① (0), and $W_{12}$ indicates a shock wave speed value from the road section ① to the road section ②, etc., In this way, a shock wave speed matrix may be derived by determining shock wave speeds for all road sections. However, an initial shock wave speed matrix $W_{init}$ in Equation 7 may not reflect a physical connection relationship between roads.

Accordingly, the future speed prediction apparatus 100 may determine a shock wave speed matrix $W_{propagate}$ propagated between roads as shown in Equation 8 below by reflecting physical connections between roads. (Equation 8)

$$w_{propagate} = w_{inix}\ x \otimes A = \begin{bmatrix} w_{11} & \cdots & w_{18} \\ \vdots & \ddots & \vdots \\ w_{81} & \cdots & w_{88} \end{bmatrix} \otimes A =$$

$$\begin{bmatrix} 0 & 0 & w_{13} & 0 & w_{15} & w_{16} & 0 & 0 \\ w_{21} & 0 & 0 & 0 & 0 & 0 & 0 & 0 \\ 0 & 0 & 0 & 0 & 0 & 0 & 0 & 0 \\ w_{41} & 0 & 0 & 0 & 0 & 0 & 0 & 0 \\ 0 & 0 & 0 & 0 & 0 & 0 & 0 & 0 \\ 0 & 0 & 0 & 0 & 0 & 0 & w_{67} & w_{68} \\ 0 & 0 & 0 & 0 & 0 & 0 & 0 & 0 \\ 0 & 0 & 0 & 0 & 0 & 0 & 0 & 0 \end{bmatrix} [\text{m/5 minute}]$$

That is, the future speed prediction apparatus 100 may determine the shock wave speed matrix $W_{propagate}$ including shock waves to be propagated one time between physically connected roads by element-wise multiplication of the initial shock wave speed matrix $W_{init}$ with the adjacency matrix A considering the physical connection within a unit time T.

Next, the future speed prediction apparatus 100 may define a congestion severity vector $G_T$ using the shock wave speed matrix $W_{propagate}$. As shown in equation 9 below, congestion severity G may be determined through determination of the adjacency matrix A and a node feature vector E.

$$G = (A, E) \quad \text{(Equation 9)}$$

Herein, G indicates the congestion severity, A indicates the adjacency matrix, and E indicates the node feature vector.

$$G_r = \begin{bmatrix} g_{T,1} \\ \vdots \\ g_{T,n} \end{bmatrix} = \begin{bmatrix} \dfrac{\sum_j W_{propagate,1:j}}{\sum_j A_{1:j}} \\ \dfrac{\sum_j W_{propagate,n:j}}{\sum_j A_{n:j}} \end{bmatrix} \quad \text{(Equation 10)}$$

In the future speed prediction apparatus 100, an element $g_n$ of the congestion severity vector $G_T$ may be formed of a sum ($\Sigma_j\ W_{propagate,1:j}$) of the shock wave speed to be propagated compared to a number ($\Sigma_j\ A_{1:j}$) of intersections that can be driven at a point n. In this case, n may include a number of road sections.

For example, the sum ($\Sigma_j\ W_{propagate,1:j}$) of the shock wave speeds is a sum of all values from column 1 to column j of a first row of the shock wave speed matrix $W_{propagate}$ in Equation 8. That is, it is a sum of values of $W_{13}$, $W_{15}$, and $W_{16}$.

The number of intersections ($\Sigma_j\ A_{1:j}$)) that can be driven at the point n is a sum of all the columns 1 to J of the first row of the adjacency matrix A. The first row of the adjacency matrix A is "0 0 1 0 1 1 0 0", so adding up values in each column equals 1+1+1, which is 3. Accordingly, congestion severity $G_{T,1}$ becomes $(W_{13}+W_{15}+W_{16})/3$.

The congestion severity $G_{T,1}$ becomes an average value of a speed of a shock wave that will propagate once in a direction of each adjacent road.

The future speed prediction apparatus 100 may use the congestion severity vector $G_T$ to define a congestion activation vector JT as shown in Equation 11.

$$J_T = \begin{bmatrix} j_{T,1} \\ \vdots \\ j_{T,n} \end{bmatrix},\ j_{T,n} = \sigma(g_{T,n} + l_n) | \sigma(x) = \min(x, 0) \quad \text{(Equation 11)}$$

The future speed prediction apparatus 100 may determine the congestion activation vector $J_T$ by applying a value obtained by adding a distance vector In of each road section to the congestion severity vector $G_T$ to a filter σ(x) through which only negative numbers pass.

That is, the future speed prediction apparatus 100 may determine the congestion activation vector $J_T$ by adding the distance In of each road to the average congestion severity $g_{T,n}$, and this congestion activation vector $J_T$ is used as an indicator of an excess traffic volume that will saturate the current road section within a unit time to cause congestion.

Accordingly, a positive value ($g_{T,n}+I_n$) obtained by adding the distance In of each road to the average congestion severity $g_{T,n}$ indicates that congestion is resolved within a unit time (e.g., 5 minutes) on the current road. On the other hand, a negative value obtained by adding the distance In of each road to the average congestion severity $g_{T,n}$ indicates that congestion occurs beyond the current road to adjacent roads.

The future speed prediction apparatus 100 may determine a congestion vector $J_{T,N}$ using the congestion activation vector $J_T$. The congestion vector $J_{T,N}$ is a vector that represents the degree to which congestion is propagated once from the congestion activation vector $J_T$ to adjacent roads.

The future speed prediction apparatus 100 may determine the congestion vector $J_{T,N}$ by matrix multiplying the congestion activation vector $J_{T,0}$ determined based on current traffic propagation by the adjacency matrix AN squared N times. In this case, N indicates a unit time.

$$J_{T,1} = AJ_{T,0};\ J_{T,N} = A^N J_{T,0} \quad \text{(Equation 12)}$$

$$J_N = [J_{T,1} \cdots J_{T,N}] \quad \text{(Equation 13)}$$

The future speed prediction apparatus 100 may configure (e.g., generate) a congestion matrix $J_N$ by determining an expected congestion vector from the current time to N unit time later.

That is, the congestion activation vector $J_{T,0}$ refers to a degree to which congestion is propagated based on current traffic volume propagation, the congestion activation vector $J_{T,1}$ refers to a degree to which congestion is propagated after a predetermined unit time (e.g., 5 minutes), the congestion activation vector $J_{T,2}$ refers to an extent to which congestion is propagated in response to (e.g., in, based on) a predetermined unit of time passing twice (e.g., 5 minutes*2=10 minutes later), and the congestion activation vector $J_{T,N}$ refers to a degree to which congestion is propagated in response to (e.g., in, based on) N times passing a predetermined unit time (e.g., after N*5 minutes).

As such, the extent to which congestion is propagated based on the current traffic volume propagation, the extent to which congestion is propagated after 5 minutes, the extent to which congestion is propagated after 10 minutes, and the extent to which congestion is propagated after 5N minutes may be configured as a congestion matrix ($J_N$).

Figure 6:
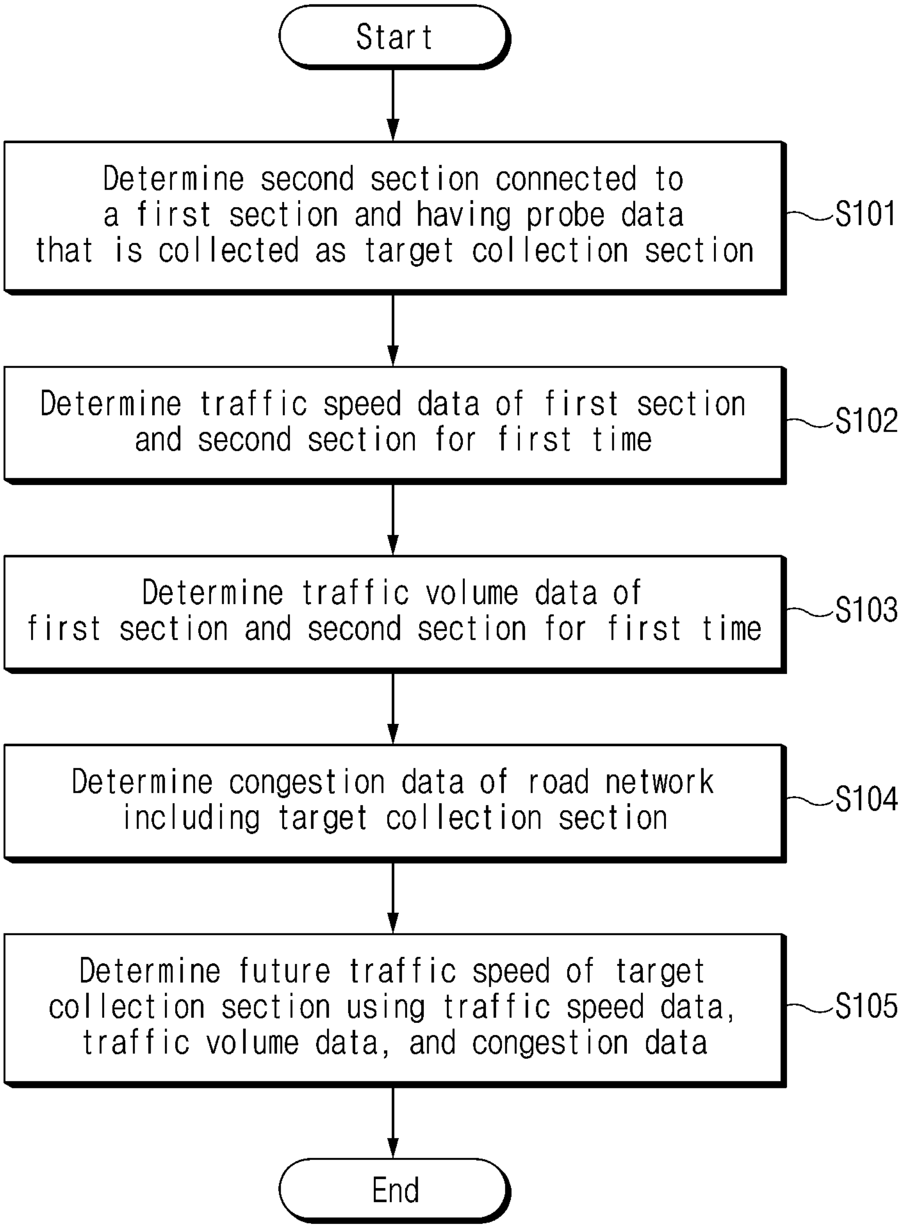
FIG. 6 illustrates a flowchart showing an example traffic speed prediction method.

Hereinafter, a traffic speed prediction method according to an example of the present disclosure will be described with reference to FIG. 6. FIG. 6 illustrates a flowchart showing an example traffic speed prediction method.

Hereinafter, it is assumed that the traffic speed prediction apparatus 100 of the of FIG. 1 performs processes of FIG. 6. Also, or alternatively, in the description of FIG. 6, operations described as being performed by a device may be understood as being controlled by the processor 140 of the traffic speed prediction apparatus 100. In following examples, operation of steps S101 to S105 may be performed sequentially, but are not necessarily performed sequentially. For example, an order of each operation may be changed, and at least two operations may be performed in parallel.

Referring to FIG. 6, the traffic speed prediction apparatus 100 may determine a second section connected to a first section and having probe data that is collected as a target collection section (S101). For example, the first section may include a road section ahead of the second section.

The traffic speed prediction apparatus 100 may determine the target collection section based on at least one of direction information included in link information of the first section and the second section, whether probe data is detected in the first section, or a combination thereof.

The traffic speed prediction apparatus 100 may differently determine whether the second section is connected to the first section according to characteristics of a road.

In response to (e.g., in, based on) a case where the second section is an urban road, the traffic speed prediction apparatus 100 may determine whether the second section is connected to the first section based on whether a direction included in the link information of the first section, which is the road section ahead of the second section, matches a direction included in the link information of the second section. Specifically, the traffic speed prediction apparatus 100 may determine that the second section is connected to the first section in response to (e.g., in, based on) a case where the direction included in the link information of the first section matches the direction included in the link information of the second section.

In response to (e.g., in, based on) the case where the second section is an urban road, the traffic speed prediction apparatus 100 may determine whether the second section is connected to the first section based on whether probe data is detected in the first section, which is the road section ahead of the second section. Specifically, in response to (e.g., in, based on) a case where the probe data is detected in the first section and the probe data is detected in the second section, the traffic speed prediction apparatus 100 may determine that the second section is connected to the first section.

In the traffic speed prediction apparatus 100, in response to (e.g., in, based on) a case where the second section is a highway, a processor may determine whether the second section is connected to the first section based on whether probe data is detected in the first section, which is the road section ahead of the second section. Specifically, in response to (e.g., in, based on) a case where the probe data is detected in the first section and the probe data is detected in the second section, the processor may determine that the second section is connected to the first section.

In the traffic speed prediction apparatus 100, in response to (e.g., in, based on) a case where the second section is a highway and the first section, which is the road ahead of the second section, is an urban road, the processor may determine that the second section is connected to the first section in a state where the direction included in the link information of the first section matches the direction included in the link information of the second section.

The traffic speed prediction apparatus 100 may output first output data by using traffic speed data for a predetermined time (e.g., first time) obtained based on probe data collected in the first section and the second section (S102). The first output data includes traffic speed data for past M hours.

The traffic speed prediction apparatus 100 may output second output data using traffic volume data for the first time obtained based on probe data collected in the first section and the second section (S103).

In response to (e.g., in, based on) a case where probe data exists in the first section, the traffic speed prediction apparatus 100 may determine the remaining traffic volume corresponding to the number of probe vehicles driving in the second section by using the probe data in the second section and the probe data in the first section.

For example, the remaining traffic volume may be determined by subtracting the number of probe vehicles passing a last point of the first section from the number of probe vehicles passing a last point of the second section.

In response to (e.g., in, based on) a case where no probe data exists in the first section, the traffic speed prediction apparatus 100 may determine an exit traffic volume corresponding to the number of probe vehicles passing the last point of the second section. In this case, the second output data may not include the remaining traffic volume but may include the exit traffic volume.

The traffic speed prediction apparatus 100 may output third data using congestion data for the first time obtained based on probe data collected in the first section and the second section (S104).

The traffic speed prediction apparatus 100 may predict a traffic speed of a road including the second section by applying the first output data, the second output data, and the third output data to a traffic speed prediction model (S105).

The traffic speed prediction apparatus 100 may predict a traffic speed for a specified time in the future (e.g., N unit times in the future) by inputting the first output data, second output data, and third output data into the traffic speed prediction model.

As such, The traffic speed prediction apparatus may utilize remaining traffic volume, traffic speed, and congestion data to facilitate prediction of the future traffic speed in response to (e.g., in, based on) a case where vehicles enter from multiple roads, such as urban road intersections.

Figure 7:
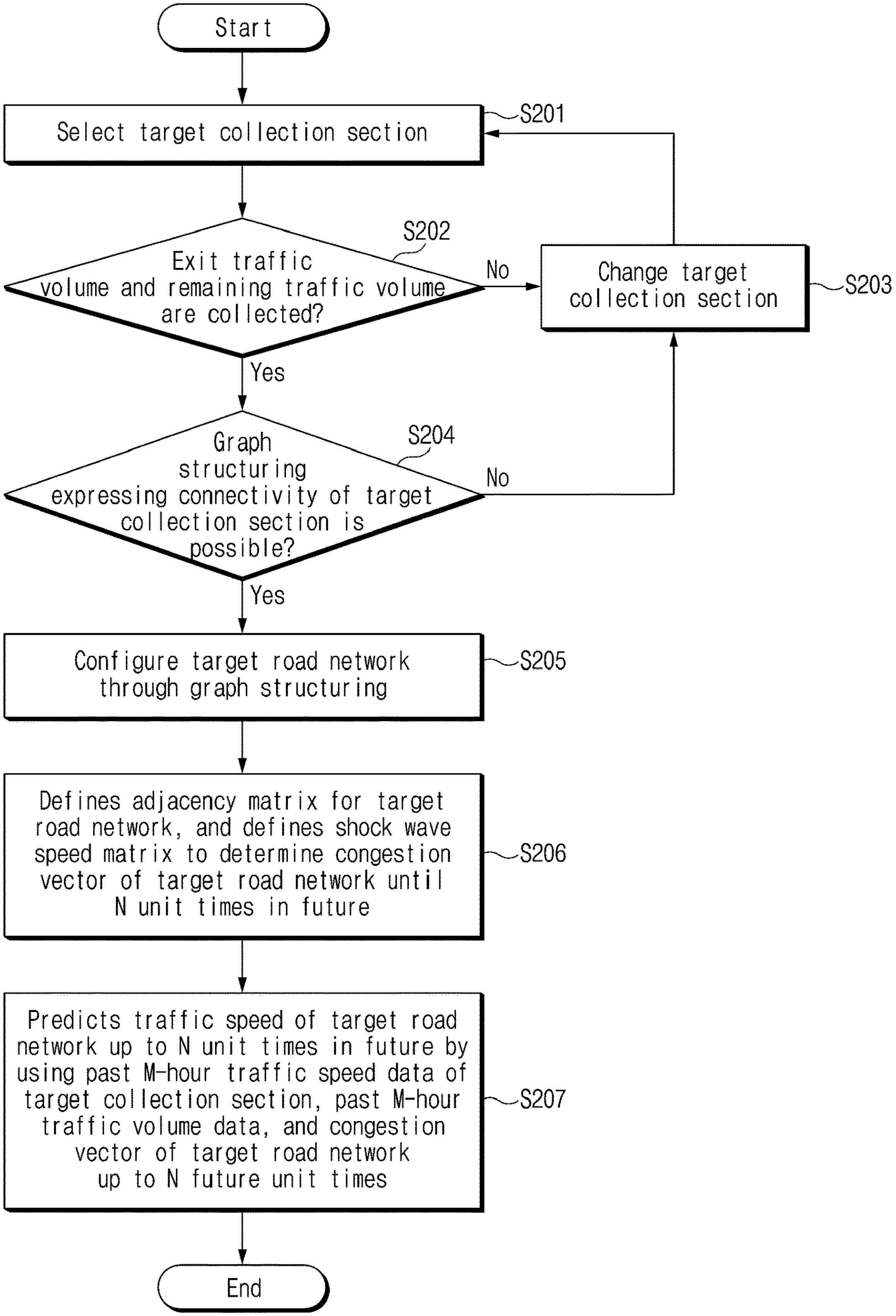
FIG. 7 illustrates a flowchart showing an example method of determining a congestion matrix for traffic speed prediction.

Hereinafter, a traffic speed prediction method according to an example of the present disclosure will be described with reference to FIG. 7. FIG. 7 illustrates a flowchart showing an example method of determining a congestion matrix for traffic speed prediction.

Hereinafter, it is assumed that the traffic speed prediction apparatus 100 of the of FIG. 1 performs processes of FIG. 7. Also, or alternatively, in the description of FIG. 7, operations described as being performed by a device may be understood as being controlled by the processor 140 of the traffic speed prediction apparatus 100. In following examples, operations of steps S201 to S207 may be performed sequentially, but are not necessarily performed sequentially. For example, an order of each operation may be changed, and at least two operations may be performed in parallel.

Referring to FIG. 7, the traffic speed prediction apparatus 100 select a target collection section (S201). In this case, the traffic speed prediction apparatus 100 may select a road section (or target collection section) capable of collecting traffic volume data from among all sections of a road.

The traffic speed prediction apparatus 100 may determine that an exit traffic volume and a remaining traffic volume of the target collection section are collected (S202). In response to (e.g., in, based on) a case where the exit traffic volume and the remaining traffic volume of the target collection section are not collected, the traffic speed prediction apparatus 100 may select another section as the target collection section (S203).

In response to (e.g., in, based on) a case where the exit traffic volume and the remaining traffic volume of the target collection section are collected, the traffic speed prediction apparatus 100 may determine whether it is possible to accomplish graph structuring expressing connectivity of the target collection section as shown in FIG. 5B (S204).

In response to (e.g., in, based on) a case where the graph structuring is not possible, the traffic speed prediction apparatus 100 selects a new target collection section as another section (S203).

In response to (e.g., in, based on) a case where the graph structuring is possible, the traffic speed prediction apparatus 100 configures a target road network (S205). In this case, configuration of the target road network may indicate performing graph structuring on the target road network as illustrated in FIG. 5B.

The traffic speed prediction apparatus 100 defines an adjacency matrix for the target road network, and defines a shock wave speed matrix to determine a congestion vector of the target road network until N unit times in the future (S206).

Next, the traffic speed prediction apparatus 100 predicts a traffic speed of the target road network up to N unit times in the future by using past M-hour traffic speed data of the target collection section, past M-hour traffic volume data, and the congestion vector of the target road network up to N future unit times (S207).

As such, according to the present disclosure, prediction accuracy of the future traffic speed may be increased by predicting the future traffic speed of the target road network using not only traffic speed data and traffic volume data, but also the congestion matrix, Also, or alternatively, according to the present disclosure, prediction accuracy of the future traffic speed may be increased by matrix multiplying the congestion activation vector and the adjacency matrix of the road network to determine the congestion matrix and by efficiently reflecting relationships between road sections in a road network with many intersections to use a congestion matrix that takes causality into consideration.

Also, or alternatively, the present disclosure may determine the shock wave speed for each road section and may determine a length through which congestion propagates per predetermined unit time, and it is disabled in a state where a length of congestion propagation does not exceed the length of the road section, so it is not determined in the congestion matrix, thereby preventing an accumulation and dissipation phenomenon.

Figure 8:
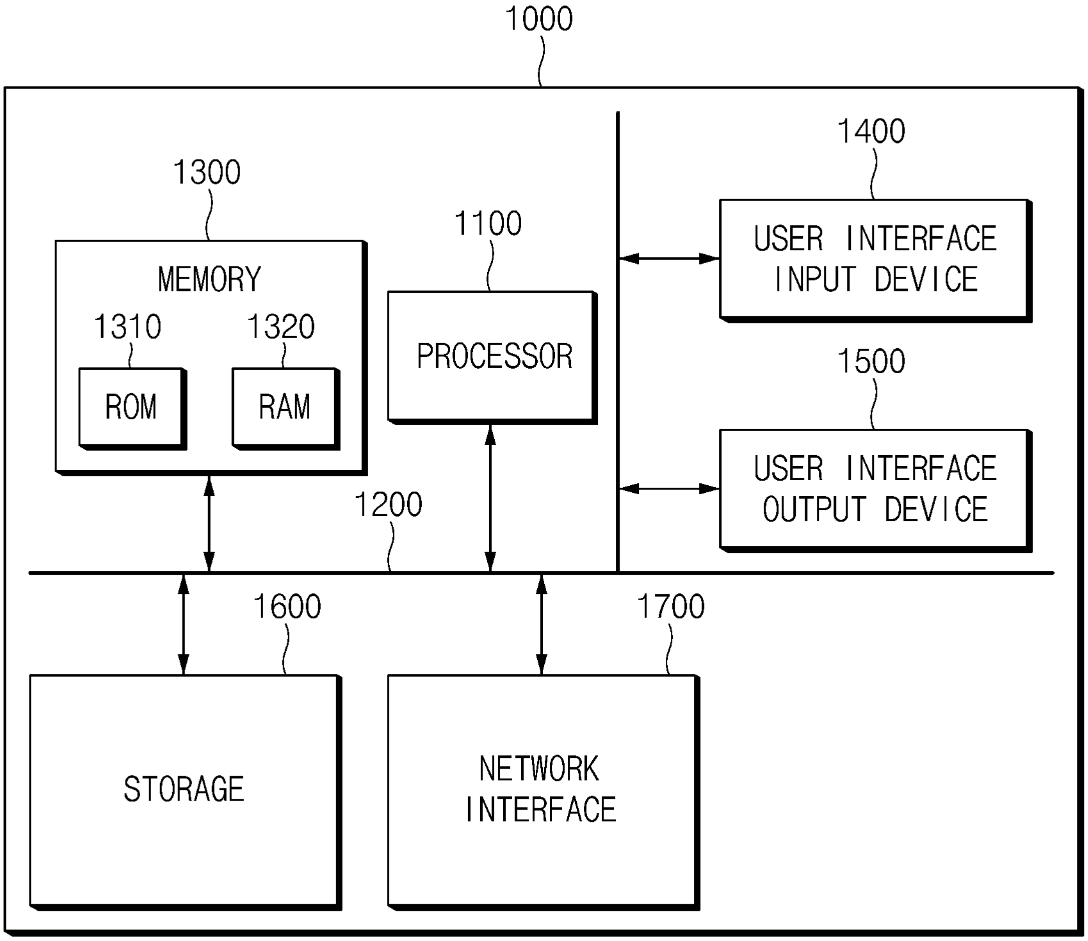
FIG. 8 illustrates an example computing system.

FIG. 8 illustrates an example computing system.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the examples disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The present disclosure provides a traffic speed prediction apparatus, and a method therefor, capable of accurately predicting future traffic speeds using a past traffic speed of a road section, a past traffic volume of the road section, and congestion data of a road network.

The present disclosure provides a traffic speed prediction apparatus, and a method therefor, capable of generating a congestion matrix by estimating a propagation time of a congested road network based on shock wave theory and predicting a future traffic condition by using the congestion matrix.

The technical objects of the present disclosure are not limited to the objects mentioned herein, and other technical objects not mentioned may be clearly understood by those skilled in the art from the description of the claims.

The present disclosure provides a traffic speed prediction apparatus including: a communication device configured to receive probe data from a probe vehicle driving on a road; a storage configured to store data and algorithms for predicting a traffic speed; and at least one processor electrically connected to the communication device and the storage, wherein the processor to predict the traffic speed on the road using traffic speed data, traffic volume data, and congestion data obtained based on probe data, and to obtain the congestion data by creating a target road network including a target collection section where the probe data is collected and determining a congestion matrix of the target road network.

The processor may be configured to determine a congestion matrix by using at least one of traffic speed data within the target road network, an exit traffic volume, which is a quantity of vehicles advancing from the target collection section to a road section ahead, a length of each road section within the target road network, or any combination thereof.

The processor may be configured to generate the target road network by shaping a traffic flow of adjacent road sections into a directional graph structure based on the target collection section.

The processor may be configured to determine an initial shock wave speed matrix by determining shock wave speeds of road sections within the target road network.

The processor may be configured to determine a shock wave speed from a first road section to a second road section by using at least one of a traffic volume entering the first road section among the road sections, a traffic volume entering the second road section among the road sections, density of a traffic flow on the first road section, density of a traffic flow on the second road section, or any combination thereof.

The processor may be configured to, in response to a case where n road sections are included in the target road network, store a shock wave speed propagating from the first road section to the second road section, a shock wave speed propagating from the first road section to a third road section, and a shock wave speed propagating from the first road section to a $n^{th}$ road section as values of a first row of the shock wave speed matrix; a shock wave speed propagating from the second road section to the first road section, a shock wave speed propagating from the second road section to the third road section, and a shock wave speed propagating from the second road section to the $n^{th}$ road section as values of a second row of the shock wave speed matrix; and a shock wave speed propagating from the $n^{th}$ road section to the first road section, a shock wave speed propagating from the $n^{th}$ road section to the third road section, and a shock wave speed propagating from the $n^{th}$ road section to the $n^{th}$ road section as values of a second row of the shock wave speed matrix, for example, to configure the initial shock wave speed matrix.

The processor may be configured to determine an adjacency matrix by reflecting a traffic flow of road sections adjacent to the target collection section within the target road network.

The processor may be configured, in response to a case where n road sections are included in the target road network, to configure the adjacency matrix in a form of a square matrix of n×n, and to store information related to a traffic flow of n adjacent road sections as 0 or 1 based on the first road section in the first row of the adjacency matrix, to store information related to a traffic flow of n adjacent road sections as 0 or 1 based on the second road section in the second row of the adjacency matrix, and to store information related to a traffic flow of n adjacent road sections as 0 or 1 based on the $n^{th}$ road section in the $n^{th}$ row of the adjacency matrix.

The processor may be configured to store information related to a traffic flow of a corresponding road section as "1" in response to a case where traffic flows in a direction entering the first road section among the n road sections, and to store information related to a traffic flow of a corresponding road section as "0" in response to the case where traffic flows in the direction exiting the first road section among the n road sections.

The processor may be configured to determine the initial shock wave speed matrix and the adjacency matrix to determine a shock wave speed matrix that represents a speed of a shock wave propagated for each road section.

The processor may be configured to determine a congestion severity vector representing an average congestion severity per number of intersections for each road section by using the shock wave speed matrix and the adjacency matrix.

The processor may be configured to determine an n×1 congestion severity vector by using a sum of shock wave speeds of the n road sections in the shock wave speed matrix and a number of drivable intersections of the n road sections in the adjacency matrix.

The processor may be configured to determine a congestion activation vector that indicates resolution or propagation of congestion by using a value obtained by adding a distance vector of each road section to the congestion severity vector.

The processor may be configured to use a negative passing filter, to determine that congestion will be resolved within a predetermined unit time in a current road section in response to a case where the sum of the congestion severity vector and the distance vector of each road section is positive, and to determine that congestion will occur from the current road section to the adjacent road section in response to a case where the sum of the congestion severity vector and the distance vector of each road section is negative.

The processor may be configured to determine a congestion vector that represents an extent to which congestion spreads to adjacent road sections by matrix multiplying the congestion activation vector with an adjacency matrix squared N times.

The processor may be configured to form a congestion matrix by determining an expected congestion vector from a current point to N unit time later.

The processor may be configured to predict a traffic speed of the target road network up to N unit times in the future by using traffic speed data and traffic volume data for past M hours of the target collection section and congestion data up to N unit times in the future for the target road network.

The present disclosure provides a traffic speed prediction method including: receiving, by a processor, probe data from a probe vehicle driving on a road; obtaining, by the processor, traffic speed data and traffic volume data based on the probe data; generating, by the processor, a target road network including a target collection section where the probe data is collected; obtaining, by the processor, congestion data by determining a congestion matrix of the target road network; and predicting, by the processor, a traffic speed on the road using the traffic speed data, the traffic volume data, and the congestion data.

The obtaining of the congestion data by determining the congestion matrix of the target road network may include to determine a congestion matrix by using at least one of traffic speed data within the target road network, an exit traffic volume, which is a quantity of vehicles advancing from the target collection section to a road section ahead, a length of each road section within the target road network, or any combination thereof.

The generating of the target road network including a target collection section where the probe data is collected may include generating the target road network by shaping a traffic flow of adjacent road sections into a directional graph structure based on the target collection section.

According to the present technique, it is possible to improve a future traffic speed prediction performance by accurately predicting future traffic speeds using a past traffic speed of a road section, a past traffic volume of the road section, and congestion data of a road network.

According to the present technique, it is also possible to improve a future traffic speed prediction performance by generating a congestion matrix by estimating a propagation time of a congested road network based on shock wave theory and predicting a future traffic condition by using the congestion matrix.

Furthermore, various effects that can be directly or indirectly identified through this document may be provided.

The above description is merely illustrative of the technical idea of the present disclosure, and those skilled in the art to which the present disclosure pertains may make various modifications and variations without departing from the essential characteristics of the present disclosure.

Therefore, the examples disclosed in the present disclosure are not intended to limit the technical ideas of the present disclosure, but to explain them, and the scope of the technical ideas of the present disclosure is not limited by these examples. The protection range of the present disclosure should be interpreted by the claims below, and all technical ideas within the equivalent range should be interpreted as being included in the scope of the present disclosure.

What is claimed is:

1. A vehicle comprising:
a communication circuit configured to receive probe data from a probe vehicle driving on a road;
a storage configured to store the probe data and algorithms for predicting a traffic speed; and
a processor coupled to the communication circuit and the storage,
wherein the processor is configured to:
predict, based on traffic speed data, traffic volume data, and congestion data, a traffic speed on the road in real time while the vehicle is driving on a section of the road, wherein the traffic speed data, the traffic volume data, and the congestion data are based on the probe data;
obtain the congestion data by:
generating a target road network comprising a target collection section corresponding to a location from which the probe data is collected; and
determining a congestion matrix of the target road network, wherein the congestion matrix indicates an extent to which congestion is propagated; and
share the predicted traffic speed on the road with at least one second vehicle driving on the road,
wherein the processor is configured to predict the traffic speed on the road by:
identifying shock wave speeds of road sections within the target road network;
generating a shock wave speed matrix based on the identified shock wave speeds of the road sections within the target road network; and
determining, based on the shock wave speed matrix, a congestion severity vector representing an average congestion severity per number of intersections for each road section.

2. The vehicle of claim 1, wherein
the processor is configured to determine the congestion matrix based on at least one of:
traffic speed data within the target road network,
an exit traffic volume value indicating a quantity of vehicles advancing from the target collection section to a road section ahead, or
a length of each road section within the target road network.

3. The vehicle of claim 1, wherein
the processor is configured to generate the target road network by shaping a traffic flow of adjacent road sections to the target collection section into a directional graph structure.

4. The vehicle of claim 1, wherein
the processor is configured to determine a shock wave speed from a first road section to a second road section based on at least one of: a traffic volume entering the first road section among the road sections, a traffic volume entering the second road section among the road sections, density of a traffic flow on the first road section, or density of a traffic flow on the second road section, and
the processor is configured to predict the traffic speed on the road using an artificial neural network comprising an input layer, an output layer, and a plurality of hidden layers, wherein the artificial neural network is configured to receive the traffic speed data, the traffic volume data, and the congestion matrix as input data and to output predicted speed data for the target road network as output data.

5. The vehicle of claim 1, wherein
the processor is configured to: configure an initial shock wave speed matrix for n road sections in the target road network by storing:
in a first row of the initial shock wave speed matrix:
a shock wave speed propagating from a first road section to a second road section,
a shock wave speed propagating from the first road section to a third road section, and
a shock wave speed propagating from the first road section to a $n^{th}$ road section, in a second row of the initial shock wave speed matrix:
a shock wave speed propagating from the second road section to the first road section,
a shock wave speed propagating from the second road section to the third road section, and
a shock wave speed propagating from the second road section to the $n^{th}$ road section; and in a third row of the initial shock wave speed matrix:

a shock wave speed propagating from the $n^{th}$ road section to the first road section, a shock wave speed propagating from the $n^{th}$ road section to the third road section, and a shock wave speed propagating from the $n^{th}$ road section to the $n^{th}$ road section.

6. The vehicle of claim 1, wherein the processor is configured to generate an adjacency matrix reflecting a traffic flow of road sections adjacent to the target collection section within the target road network.

7. The vehicle of claim 6, wherein the processor is configured to: configure the adjacency matrix in a form of an n×n square matrix based on n road sections in the target road network, wherein, each entry of the adjacency matrix comprises information indicating whether traffic is flowing into a road section corresponding to a row of the entry from a road section corresponding to a column of the entry.

8. The vehicle of claim 7, wherein the information comprises a value of 1 to indicate the traffic flows into the road section corresponding to the row of the entry from the road section corresponding to the column of the entry, and wherein the information comprises a value of 0 to indicate the traffic does not flow into the road section corresponding to the row of the entry from the road section corresponding to the column of the entry.

9. The vehicle of claim 6, wherein the processor is configured to:

determine, based on an initial shock wave speed matrix and the adjacency matrix, the shock wave speed matrix that represents a speed of a shock wave propagated for each road section.

10. The vehicle of claim 9, wherein the processor is configured to determine, based on the shock wave speed matrix and the adjacency matrix, the congestion severity vector.

11. The vehicle of claim 10, wherein the processor is configured to determine, based on a sum of a distance vector of each road section and the congestion severity vector, a congestion activation vector that indicates resolution or propagation of congestion.

12. The vehicle of claim 11, wherein the processor is configured to apply a negative passing filter to the congestion activation vector to:

determine that congestion will be resolved within a predetermined unit time in a current road section based on the sum of the congestion severity vector and the distance vector of each road section being positive, or determine that congestion will occur from the current road section to the adjacent road section based on the sum of the congestion severity vector and the distance vector of each road section being negative.

13. The vehicle of claim 11, wherein the processor is configured to determine, by matrix multiplying the congestion activation vector with an adjacency matrix squared N times, a congestion vector that represents an extent to which congestion spreads to adjacent road sections.

14. The vehicle of claim 13, wherein the processor is configured to form the congestion matrix by determining an expected congestion vector from a current point to N unit time later.

15. The vehicle of claim 9, wherein the processor is configured to determine an n×1 congestion severity vector generated based on a sum of shock wave speeds of n road sections in the shock wave speed matrix and based on a number of drivable intersections of the n road sections in the adjacency matrix.

16. The vehicle of claim 1, wherein the processor is configured to predict, based on traffic speed data and traffic volume data for a past M unit times of the target collection section and congestion data up to a future N unit times for the target road network, a traffic speed of the target road network up to N unit times in the future.

17. A method performed by a vehicle, the method comprising:

receiving, by a processor of the vehicle, probe data from a probe vehicle driving on a road;

obtaining, by the processor, traffic speed data and traffic volume data based on the probe data;

generating, by the processor, a target road network comprising a target collection section corresponding to a location where the probe data was collected by the probe vehicle;

determining, by the processor, congestion data comprising a congestion matrix of the target road network, wherein the congestion matrix indicates an extent to which congestion is propagated;

using the traffic speed data, the traffic volume data, and the congestion data, predicting, by the processor, a traffic speed on the road in real time while the vehicle is driving on a section of the road; and sharing the predicted traffic speed on the road with at least one second vehicle driving on the road, wherein the predicting the traffic speed on the road comprises:

identifying shock wave speeds of road sections within the target road network;

generating a shock wave speed matrix based on the identified shock wave speeds of the road sections within the target road network; and determining, based on the shock wave speed matrix, a congestion severity vector representing an average congestion severity per number of intersections for each road section.

18. The method of claim 17, wherein the determining the congestion data comprising the congestion matrix of the target road network comprises determining, by the processor, the congestion matrix based on at least one of:

traffic speed data within the target road network, an exit traffic volume that is based on a quantity of vehicles advancing from the target collection section to a road section ahead, or a length of each road section within the target road network.

19. The method of claim 17, wherein the generating the target road network comprising the target collection section comprises shaping, based on traffic flow of adjacent road sections relative to the target collection section, the traffic flow into a directional graph structure.

20. An apparatus comprising:

a communication circuit configured to receive probe data from a probe vehicle driving on a road;

a storage configured to store the probe data and algorithms for predicting a traffic speed; and a processor coupled to the communication circuit and the storage, wherein the processor is configured to:

obtain congestion data by:

generating a target road network comprising a target collection section corresponding to a location from which the probe data is collected; and determining a congestion matrix of the target road network, wherein the congestion matrix indicates an extent to which congestion is propagated;

predict, based on traffic speed data, traffic volume data, and the congestion data, a traffic speed on the road, wherein the traffic speed data, the traffic volume data, and the congestion data are based on the probe data, wherein the processor is configured to predict the traffic speed on the road by:

identifying shock wave speeds of road sections within the target road network;

generating a shock wave speed matrix based on the identified shock wave speeds of the road sections within the target road network;

determining, based on the shock wave speed matrix, a congestion severity vector for at least one road section; and transmit the predicted traffic speed on the road to a plurality of vehicles driving on the road, wherein the processor is configured to predict the traffic speed on the road in real time using an artificial neural network comprising an input layer, an output layer, and at least one hidden layer, wherein the artificial neural network is configured to receive the traffic speed data, the traffic volume data, and the congestion matrix as input data and to output predicted speed data for the target road network as output data.

* * * * *